3,667,834
ADJUSTABLE LENGTH TEMPLE FOR SPECTACLES
Ellison L. Davison, Gibsonia, Carl H. Brinkhoff, Pittsburgh, and Robert F. Menold, Monroeville, Pa., assignors to Mine Safety Appliances Company, Pittsburgh, Pa.
Continuation-in-part of application Ser. No. 16,374, Mar. 4, 1970. This application Mar. 22, 1971, Ser. No. 126,572
Int. Cl. G02c 5/20
U.S. Cl. 351—118     8 Claims

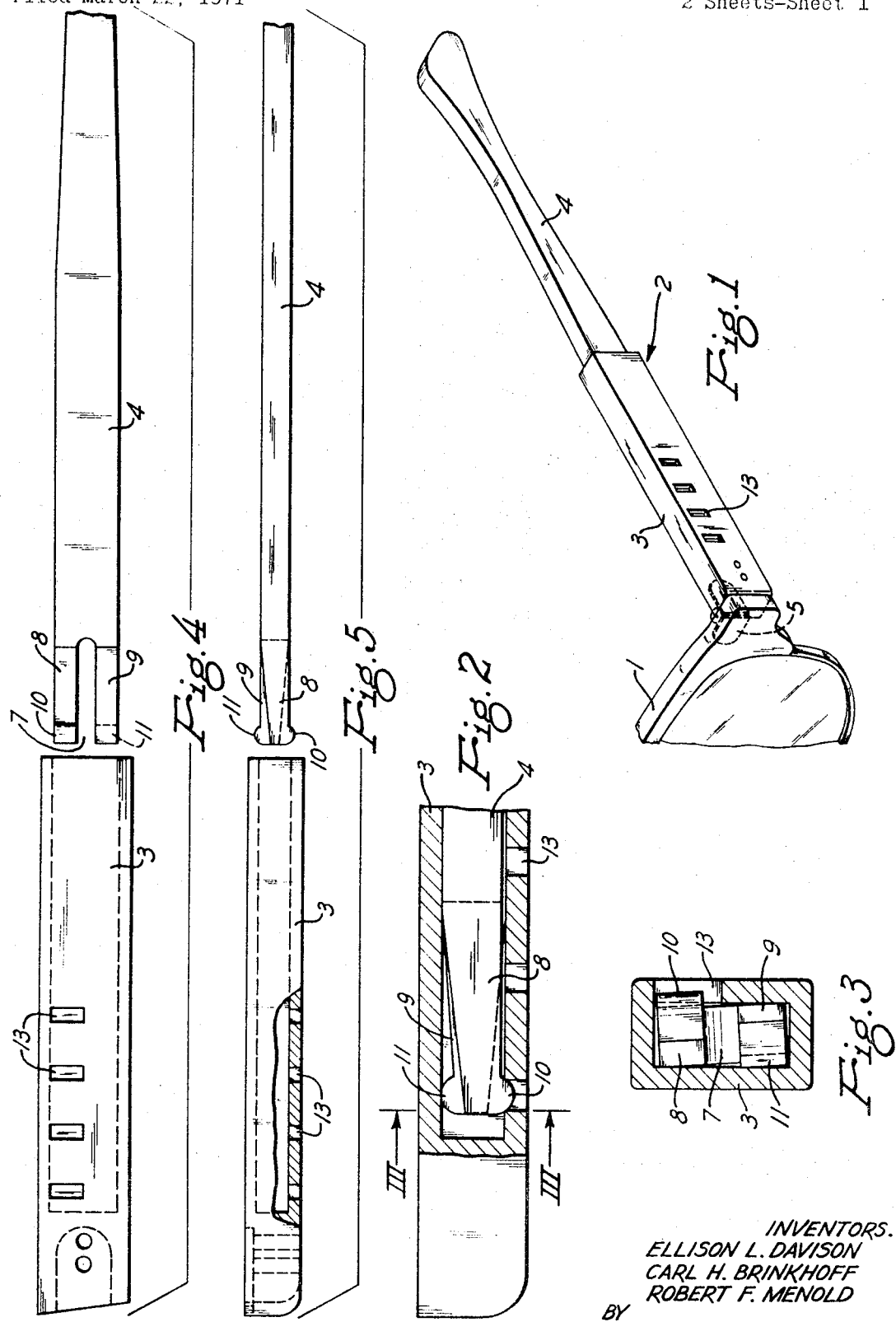

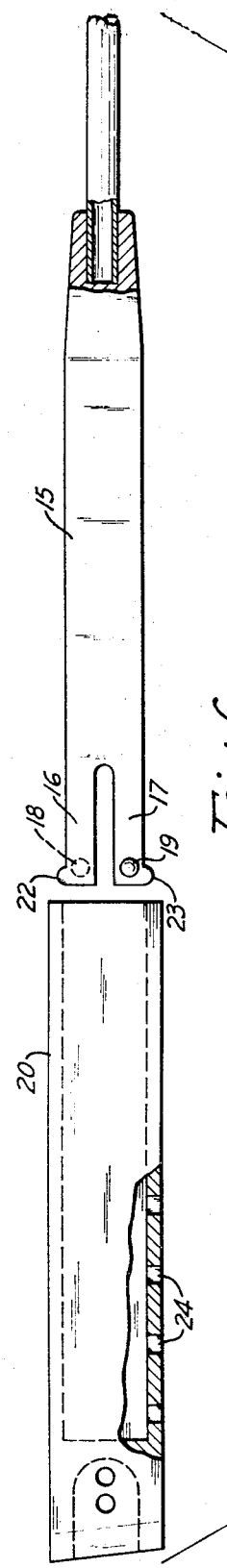
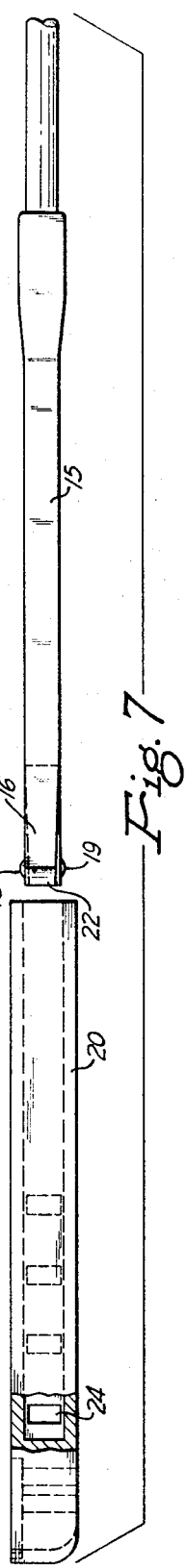
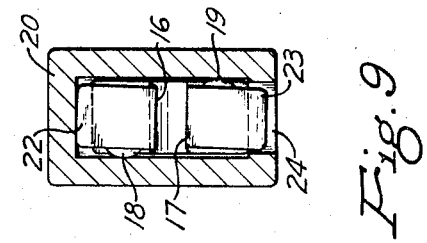
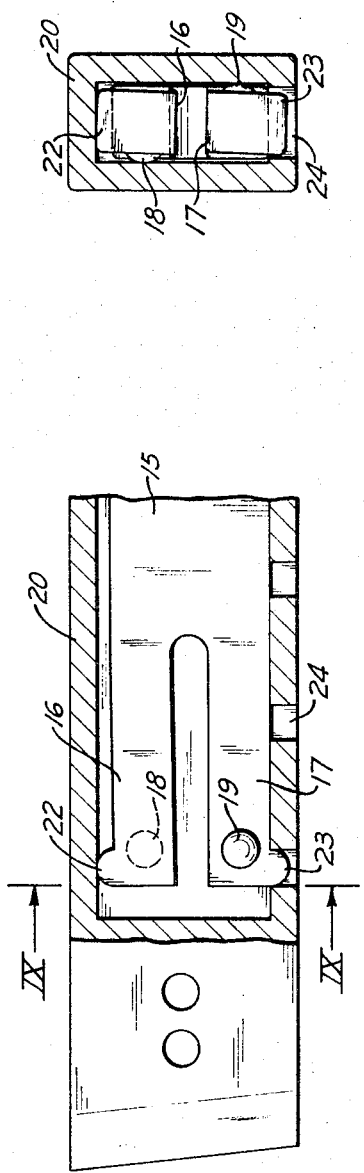
INVENTORS.
ELLISON L. DAVISON
CARL H. BRINKHOFF
ROBERT F. MENOLD
BY Brown, Murray, Flick & Peckham
ATTORNEYS.

ABSTRACT OF THE DISCLOSURE

A spectacles temple is formed from a front sleeve and a rear head-engageable temple member fitting snugly in the back end of the sleeve and slidable lengthwise in it. The front end of the rear member is provided with a slot separating it into upper and lower spring prongs. One prong is provided with a laterally projecting boss pressed tightly against the sleeve, and the other prong is provided with a locking boss projecting into a recess in a row of longitudinally spaced recesses in the sleeve wall to normally lock the temple member and sleeve together.

---

This application is a continuation-in-part of our copending patent application, Ser. No. 16,374, filed Mar. 4, 1970, now abandoned.

It is among the objects of this invention to provide an adjustable length temple which is simple in construction, which is easy to adjust, and in which the relatively movable parts fit tightly together so that the temple is rigid and stable.

The invention is illustrated in the accompanying drawings, in which

FIG. 1 is a fragmentary perspective view of spectacles;
FIG. 2 is an enlarged fragmentary horizontal section of one of the adjustable temples;
FIG. 3 is a cross section taken on the line III—III of FIG. 2;
FIG. 4 is a side view of a temple with its two parts separated;
FIG. 5 is a plan view of what is shown in FIG. 4, partly broken away in section; and
FIGS. 6, 7, 8 and 9 are views similar to FIGS. 4, 5, 2 and 3, respectively, of a modification.

Referring to FIG. 1 of the drawings, each end of a typical eyeglass frame 1 has a bow or temple 2 hinged to it. The rear ends of the temples are designed to extend over the ears and either hook around the ears next to the head or press against the sides of the head behind the ears. It is a feature of this invention that the temples are readily adjustable in length so that the spectacles can be made to fit different people. This is a definite advantage for protective spectacles furnished by industrial plants to their employees, as it greatly reduces the inventory of such spectacles that has to be carried. Otherwise, a stock of several different sizes of spectacles would be necessary.

In accordance with this invention, each temple is formed from two members; a front sleeve 3 and a rear head-engaging member 4. The front end of the sleeve may be solid for a short distance and is formed for attachment to one leaf of a hinge 5 secured to the eyeglass frame. The rear end of the sleeve is open. The sleeve may take several different forms in cross section, but preferably it is square or rectangular, as shown in FIG. 3.

The rear member 4 of the temple may be formed from metal or plastic in the usual way. Its forward portion is of such shape and size as to fit snugly in the sleeve but yet not tightly enough to prevent it from being moved back and forth in the sleeve when desired. The front end of this rear temple member is provided with a short longitudinal slot 7 as shown in FIGS. 3 and 4, that separates it into upper and lower spring prongs 8 and 9. When it is outside of the sleeve, as shown in FIG. 5, one side of one prong and the opposite side of the other prong lie in planes that converge toward the front end of that member. The other side of each prong has a laterally projecting boss 10 or 11 at its front end.

Since these bosses increase the normal width of the head-engageable member, the free ends of the prongs must be sprung inwardly to permit them to enter the rear end of the sleeve. After this has been done, the rear member is moved forward in the sleeve until one of the bosses snaps into a recess 13 formed in a side wall of the sleeve. There is a row of these recesses along the sleeve, and the boss beside them can be inserted in any one of them to thereby form a temple of different lengths determined by the spacing between the recesses. The recesses are shown in a position to be entered by upper boss 10, which therefore is the locking boss, but they could be at the opposite side of the sleeve beside the other boss. The recesses may be depressions in the sleeve side wall or they may be openings extending entirely through the wall. The boss that projects into a recess is curved or tapered transversely as shown in FIG. 2, so that by pushing or pulling on the head-engageable member the boss can be removed from the recess into which it projects. The same effect can be obtained by beveling the front and rear edges of the recesses. The shape of the locking boss and the configuration of the recesses will determine the amount of force required to remove the boss from a recess.

The inside of the sleeve wall opposite to the recessed wall is solid and plain. Therefore, the prong carrying the other boss 11 remains sprung inwardly as shown in FIG. 2 and this pressure tightens the rear member in the sleeve. If the locking boss and the recesses are of such relative sizes that the boss can not project into a recess far enough to permit upper prong 8 to spring back into its normal position, this boss will cause the opposite side of the rear member to press against the unrecessed side of the sleeve, while boss 11 will cause the other side of the rear member to press against the recessed wall. The result is that a torque is exerted on the rear member, which holds it very tightly in the sleeve and thus makes the temple stiff and stable for proper fit of the spectacles.

In the modification shown in FIGS. 6 to 9, the front end of the rear temple member 15 likewise is provided with a short longitudinal slot that separates it into upper and lower spring prongs 16 and 17. Also, one side of our prong and the opposite side of the other prong are spaced or offset inwardly from the adjacent sides of the temple member, such as by lying in planes converging toward the front end of that member. The other side of each prong is provided with a laterally projecting boss 18 or 19 at its front end. This makes it necessary for the free ends of the prongs to be sprung inwardly in opposite directions in order to enter the rear end of the sleeve 20.

Unlike the first-described embodiment of this invention, the top of one prong also has a boss 22, and the bottom of the other boss is provided with a boss 23. Consequently, in order for the prongs to enter the sleeve they also must be sprung vertically toward each other, which they can do because of the slot between them. A further difference from the first embodiment is that one of the vertical bosses, preferably lower boss 23, serves as the locking boss to hold the temple member in different adjusted positions in the sleeve. For this purpose there is a row of longitudinally spaced recesses or holes 24 in the bottom wall of the sleeve for receiving the locking boss. The temple member therefore can be locked in any one of several positions in the sleeve and will stay in that position unless it is pushed or pulled hard enough to dislodge the locking boss from its recess and move it along to snap into another of the recesses.

One advantage of this modification is that the locking recesses can be located in the bottom of the sleeve, where they are less visible. Another advantage is that the prongs not only are sprung sideways, but also vertically, whereby the temple member grips the sleeve very tightly to form a more rigid connection between them.

According to the provisions of the patent statutes, we have explained the principle of our invention and have illustrated and described what we now consider to represent its best embodiment. However, we desire to have it understood that within the scope of the appended claims, the invention may be practiced otherwise than as specifically illustrated and described.

We claim:

1. An adjustable length temple for spectacles, comprising a sleeve having a rear end that is open and a front end formed for attachment to an eyeglass frame and a head-engageable temple member having a front end portion fitting snugly in said sleeve and slidable lengthwise therein, the front end of said member within the sleeve being provided with a longitudnal slot separating it into upper and lower spring prongs, one prong being provided with a laterally projecting boss adjacent its free end pressed tightly against the adjacent side of the sleeve, the other prong being provided with a laterally projecting boss adjacent its free end pressed tightly against the opposite side of the sleeve, one of the prongs also being provided with a vertical locking boss adjacent its free end, the wall of the sleeve next to the locking boss being provided with a row of longitudinally spaced recesses therein for selectively receiving the locking boss, the locking boss projecting into one of said recesses to normally lock said temple member and sleeve together in telescoped relation, and the prong carrying the locking boss being movable away from said recessed wall when pressure is applied lengthwise of said temple member to adjust it, whereby the locking boss can be forced out of said one recess so that the temple member can be moved lengthwise in said sleeve.

2. An adjustable length temple according to claim 1, in which said sleeve and temple member are rectangular in cross section.

3. An adjustable length temple according to claim 1, in which the sides of the prongs opposite to said laterally projecting bosses lie in planes converging toward the front end of said temple member when it is outside of the sleeve, and said prongs are sprung inwardly in opposite directions in said sleeve, whereby the temple member is pressed tightly against both sides of the sleeve.

4. An adjustable length temple for spectacles comprising a sleeve having a rear end that is open and a front end formed for attachment to an eyeglass frame and a head-engageable temple member having a front end portion fititng snugly in said sleeve and slidable lengthwise therein, the front end of said member within the sleeve being provided with a longitudinal slot separating it into upper and lower spring prongs, one side of each prong being spaced inwardly from the same side of the other prong when said temple member is outside of the sleeve, the other side of each prong having a laterally projecting boss at its free end, whereby said free ends must be sprung inwardly to permit said member to enter the sleeve, and a side wall of the sleeve being provided with a row of longitudinally spaced recesses therein for selectively receiving one of said bosses to normally lock said member and sleeve together in telescoped relation.

5. An adjustable length temple according to claim 4, in which said inwardly spaced sides of the prongs lie in planes converging toward the front end of said temple member when it is outside of the sleeve.

6. An adjustable length temple according to claim 4, in which the prong carrying the boss remote from said recesses remains sprung inwardly as long as said head-engageable temple member is disposed in the sleeve.

7. An adjustable length temple according to claim 4, in which said sleeve and head-engageable temple member are rectangular in cross section.

8. An adjustable length temple accordin gto claim 4, in which said recess-received boss is wider than the recesses, whereby the prong carrying that boss is sprung away from the recessed wall of the sleeve.

References Cited

UNITED STATES PATENTS

| | | | |
|---|---|---|---|
| 3,394,980 | 7/1968 | Dym | 351—118 X |
| 3,416,858 | 12/1968 | Bowes | 351—118 |

FOREIGN PATENTS

| | | | |
|---|---|---|---|
| 802,839 | 10/1958 | Great Britain | 351—118 |
| 1,197,647 | 7/1965 | Germany | 351—118 |

DAVID SCHONBERG, Primary Examiner

J. W. LEONARD, Assistant Examiner

U.S. Cl. X.R.

351—111